United States Patent
Mäkelä et al.

(10) Patent No.: US 8,033,408 B2
(45) Date of Patent: Oct. 11, 2011

(54) ENCLOSURE WITH A LEAD-THROUGH AND A GROMMET

(75) Inventors: Keijo Mäkelä, Espoo (FI); Timo Tuomisto, Helsinki (FI); Reijo Mattila, Vantaa (FI)

(73) Assignee: Ensto Finland Oy, Porvoo (FI)

( * ) Notice: Subject to any disclaimer, the term of this patent is extended or adjusted under 35 U.S.C. 154(b) by 246 days.

(21) Appl. No.: 12/227,393

(22) PCT Filed: May 15, 2007

(86) PCT No.: PCT/FI2007/000131
§ 371 (c)(1),
(2), (4) Date: Feb. 19, 2009

(87) PCT Pub. No.: WO2007/132059
PCT Pub. Date: Nov. 22, 2007

(65) Prior Publication Data
US 2009/0302034 A1    Dec. 10, 2009

(30) Foreign Application Priority Data
May 15, 2006    (FI) ...................................... 20060477

(51) Int. Cl.
*H02G 3/08*    (2006.01)
*H02G 3/22*    (2006.01)
(52) U.S. Cl. .................................... 220/3.2; 174/152 G
(58) Field of Classification Search .................... 220/3.2, 220/3.8; 174/152 G
See application file for complete search history.

(56) References Cited

U.S. PATENT DOCUMENTS

| | | | |
|---|---|---|---|
| 3,229,026 A | 1/1966 | Sulzer. | |
| 3,889,909 A | 6/1975 | Koscik | |
| 3,918,667 A | 11/1975 | Madden | |
| 4,640,479 A * | 2/1987 | Shely et al. | 248/56 |
| 4,993,724 A | 2/1991 | Hauff | |
| 5,676,339 A | 10/1997 | Simon | |
| 6,376,777 B1 | 4/2002 | Ito et al. | |
| 6,627,817 B1 | 9/2003 | Kortenbach | |
| 6,768,054 B2 * | 7/2004 | Sato et al. | 174/50 |
| 7,077,281 B2 * | 7/2006 | Sato et al. | 220/3.8 |
| 2003/0102143 A1 | 6/2003 | Sato et al. | |

FOREIGN PATENT DOCUMENTS

| | | |
|---|---|---|
| DE | 4300521 | 7/1994 |
| EP | 0789436 | 8/1997 |
| FR | 2825841 | 12/2002 |
| JP | 8-251769 | 9/1996 |
| JP | 2002-142344 | 5/2002 |
| WO | WO 2005/057749 | 6/2005 |

* cited by examiner

*Primary Examiner* — Harry Grosso
(74) *Attorney, Agent, or Firm* — Alfred A. Fressola; Ware, Fressola, Van Der Sluys & Adolphson LLP

(57) ABSTRACT

An enclosure which has a lead-through for passing a rod-like element through a wall of the enclosure, and a grommet for sealing a rod-like element to a wall of an enclosure, the grommet having a passage for passing the rod-like element therealong through the grommet and the passage having its walls adapted to fit around the rod-like element. The grommet includes a first recess adapted to match at least a rim of a cutout in the enclosure; a second recess, adapted to receive a clamping element which is adapted to secure and seal the rod-like element to the grommet by applying a radial compression to the rod-like element; one split face, which establishes an openable route between the exterior of the grommet and the passage, the split face being provided with sealing elements for an axially directed and radially directed alignment and sealing of the split face.

20 Claims, 6 Drawing Sheets

ENCLOSURE WITH A LEAD-THROUGH AND A GROMMET

CROSS REFERENCE TO RELATED APPLICATIONS

This application is the U.S. National Stage of International Application Number PCT/FI2007/000131 filed on May 15, 2007 which was published in English on November 22, 2007 under International Publication Number WO 2007/132059.

TECHNICAL FIELD

The invention relates to an enclosure which has a lead-through for passing a rod-like element through a wall of the enclosure, said lead-through being formed in a boundary surface between a base section and a lid section of the enclosure, such that either the base section or the lid section is formed with a cutout, which opens from the boundary surface into the enclosure wall and which has a rim starting from a first point of the cutout rim present at the boundary surface and extending to a second point of the cutout rim present at the boundary surface. The invention relates also to a grommet for sealing a rod-like element to a wall of an enclosure, said grommet having a passage for passing the rod-like element therealong through the grommet and said grommet having its walls adapted to fit around the rod-like element.

BACKGROUND OF THE INVENTION

In the context of this invention, the term enclosure refers to a structure, inside which can be established a sealed space. The enclosure comprises at least a front wall, a rear wall, as well as panel type walls defining a depth of the enclosure. The enclosure is also capable of being split along a division plane or boundary surface at least for a base section and a lid section, which are disengageably fastenable to each other. Typically, the enclosure is used for protecting electrical, pneumatic, optical or the like connections or equipment from external influences, such as physical contact, effects of ambient air, moisture, dust, UV radiation, etc. A few examples of the enclosure include, among others, distribution boxes, distribution cabinets, pneumatics cabinets and the like. A joint between the base section and the lid section can be effected for example by means of threaded connecting elements such as screws or by means of hinges and a clasp.

Electric cables and the like to be extended into enclosures, such as distribution boxes and the like, must be capable of being delivered through a wall of the enclosure. Depending on the installation site of an enclosure, various properties are required in the enclosure as regards tightness of the enclosure. These various conditions and a tightness class consistent therewith are determined in standard SFS-EN 60529 whereby, in the event that an enclosure fulfils certain qualifications set forth in the standard, the enclosure has a tightness which is for example IP 55 or IP 65. One objective for an enclosure lead-through and a grommet, making up the object of this invention, is to provide a solution matching the class IP55 or IP 65 of the cited standard.

The connections present inside the enclosure may not be subjected by way of a cable to pulling, pushing, bending, twisting or other such force. Hence, the actual connection point must be in a mechanically strainless condition, which is why the enclosures are provided at a lead-through point with a so-called strain relief mechanism. A strain possibly existing in a cable outside an enclosure is transmitted by this strain relief mechanism to the enclosure structure, the segment of cable thus ending up inside the enclosure in a strainless condition.

The prior art discloses various solutions for such an application which functionally requires both sealing and strain relief in an enclosure lead-through.

One traditional solution is a socket sealing to be threaded on a cable and tightened with a nut. For such a device, the wall of an enclosure is typically drilled to form a hole, followed by placing outside the enclosure a socket-like element which is mounted on the enclosure wall either by a retaining nut or by a screw thread present in the socket-like element. The socket-like element has generally further in connection therewith a seal or seals as well as sealing faces for ensuring a proper tightness between the socket, the cable and the enclosure. The cable is threaded through both and the joint is tightened. The result of this is a very tight and solid construction, which nevertheless requires a linear thread-through cable plain without prefitted connectors or the like. One example of applying such a solution is described in the publication U.S. Pat. No. 5,676,339, although the application in this case is not actually a screw-threaded but quick release-fastened lead-through socket.

Another traditional solution is a lead-through mechanism to be threaded on a cable and placed in a U- or V-shaped recess, which opens from a division plane between the lid and base sections of an enclosure, said mechanism comprising a rubber-like lead-through collar, which seals between the recess and the lid and features a hole matching the cable diameter, and which is split either partially or all the way. Such split rubber seals provide a useful solution, but a sufficient sealing effect and strain relief are difficult to achieve because of inconsistent cable diameters and symmetry defects involved therein.

One solution is a lead-through mechanism to be threaded on a cable and placed in a U- or V-shaped recess, which opens from a division plane between the lid and base sections of an enclosure, wherein a traditional sealing socket can be set tightly in a recess without threading it through a hole in the enclosure wall. In this solution, the lead-through mechanism is installable in separate operations first on a cable and only then on a wall of the enclosure, but the socket and the nut still require a plain threadable linear cable without prefitted connectors or the like.

One solution is also a collar type split version, "stocks", which is applicable with several cable to be led through. The strain relief features and the sealing features of this solution do not match those of the above-described solutions. If a high-quality sealing is desired in such "stocks" designs, its achievement requires a construction with a high compression force. Thus, the structure shall most often be expensive, complicated, and inconvenient to install.

Another publication known from the prior art is JP 2002142344, disclosing a lead-through liner or rather a water stop plug to be mounted on the end of a cable protective tube. Here, the liner is split for two parts, said half-liners aligning themselves relative to each other by means of corrugated guide faces. The external surface is sealed to the cable protective tube by means of a long urethane material attached with the help of a double-faced tape.

The prior art discloses also the publication JP 08251769, wherein the water tightness of a two-component lead-through seal has been improved by forming the division surface with complementary grooves and lands as well as with guide faces for an improved, alignment.

Another publication known from the prior art is U.S. Pat. No. 4,993,724, wherein a conduit seal is hingedly splitable and the conduit seal can be fit tightly around a conduit by using bolts to tighten the axially seal-penetrating flanges present on either side of an elastic seal element.

SUMMARY OF THE INVENTION

In the context of this invention, cables, wires, conduits, tubes and the like are referred to as a rod-like element. The cross-section of such a rod-like element can be for example circular, oval, elliptical, flat-shaped or the like.

It is an objective of the invention is to develop these prior known solutions further and to introduce a lead-through sealing and a grommet of the protection level IP 65, which are easy to use, yet at the same time adequately tight for most enclosure designs. Another objective is a functional solution with features including a sufficient strain relief capability and at the same time a sufficient tightness. An objective is also to provide a lead-through sealing, which is particularly quick to mount and dismount and, if necessary, remount. Still another objective is a solution, wherein the tools required for its mounting or dismounting are included in the conventional standard tool set of an electrician or the like fitter, whereby the fitter need not make special preparations for work processes involved in an installation of the lead-through.

An enclosure of the invention is characterized in that,
when a grommet has been set loosely in place in the cutout,
a side of the grommet corresponding to the boundary surface lies at a distance outside the boundary surface, the grommet features a first recess transverse to the axial direction of a passage for the rod-like element, and a second recess, the first recess being adapted to match the cutout rim and the second recess being adapted to receive a clamping element which is adapted to secure and seal the rod-like element to the grommet by applying a radial compression to the rod-like element;
when the enclosure has its lid section sealingly attached to the enclosure's base section, an engagement force therebetween causes the side of the grommet corresponding to the boundary surface to press itself flush with the boundary surface, the grommet clamping and sealing both against the rims of the cutout to the wall and against the side of the grommet corresponding to the boundary surface, and sealing elements in a split face of the grommet clamp and seal against each other.

On the other hand, a grommet of the invention is characterized in that the grommet includes
a side corresponding to a boundary surface;
a first recess adapted to match at least a rim of a cutout in the enclosure;
a second recess, adapted to receive a clamping element which is adapted to secure and seal the rod-like element to the grommet by applying a radial compression to the rod-like element;
one split face, which establishes an openable route between the exterior of the grommet and the passage, said split face being provided with sealing elements for an axially directed and radially directed alignment and sealing of the split face.

The invention enables the provision of a lead-through solution pursuant to the objectives, which can be easily and reliably retrofitted to a previously manufactured rod-like element, which is provided with premounted connectors.

The external dimensions of such a connector are typically substantially larger than the outer diameter of a cable associated therewith. By virtue of a splitting structure of the lead-through, the customer is able to employ ready-to-use cables or to premount connectors to cables in locations other than the installation site.

Yet another objective of the invention is a solution which is attractive in terms of its overall price. With respect to competitive solutions, the invention provides further savings for the customer by virtue of an easy and quick installation process and, additionally, there is no need for unnecessary and fault-sensitive lead-through fittings.

An engagement of the rod-like element with the grommet and further an engagement of the grommet with the wall provide a strain relief mechanism between the rod-like element and the enclosure. The strain-relief ensuring clamping element, a band-like tightener, can be an arbitrarily chosen standard product. For example, a normal 0.6 mm or 0.8 mm wide tying wire works splendidly. A fitter doing electrical or similar installations have usually such wires always at hand, whereby no special components are required for sealing the lead-through. Neither does the lead-through contain any loose parts which can be easily misplaced in the installation process.

In cramped enclosure applications, the preparation of a cable beforehand outside the enclosure facilitates installation. By using a splitting lead-through according to the invention, this is particularly easy. Especially, if the enclosure involves the use of a complicated and multipolar internal terminal with external dimensions substantially larger than the outer diameter of a cable connected thereto, the reliable preparation of such in field conditions is highly inconvenient and unreliable in terms of a final result.

In less demanding installation processes, yet enabling a reasonable level of sealing, this lead-through provides a very quick, easy and convenient installability, even without a band-like clamp. Respectively, the installation direction of a lead-through grommet can be chosen as desired according to a task at hand, the band-like clamp can be fitted either outside or inside the enclosure.

According to one preferred embodiment of the invention, in an enclosure and in a grommet of the invention, the grommet (4) in at least part of the structure is made of a material which is elastic but preferably almost incompressible, such as rubber or the like elastomer. In principle, the foamed elastic materials work as well, but from the functional standpoint the displacement of material caused by pressing is preferably to compression. Likewise, the restitution of form to the original shape achieved by the material after relieving the strain is a desirable property. In addition, the ability of a grommet to stretch in the process of fitting it around a rod-like element is a desirable property.

BRIEF DESCRIPTION OF THE DRAWINGS

One embodiment of the invention will now be described in more detail with reference to the accompanying figures.

DETAILED DESCRIPTION

Figure 1:
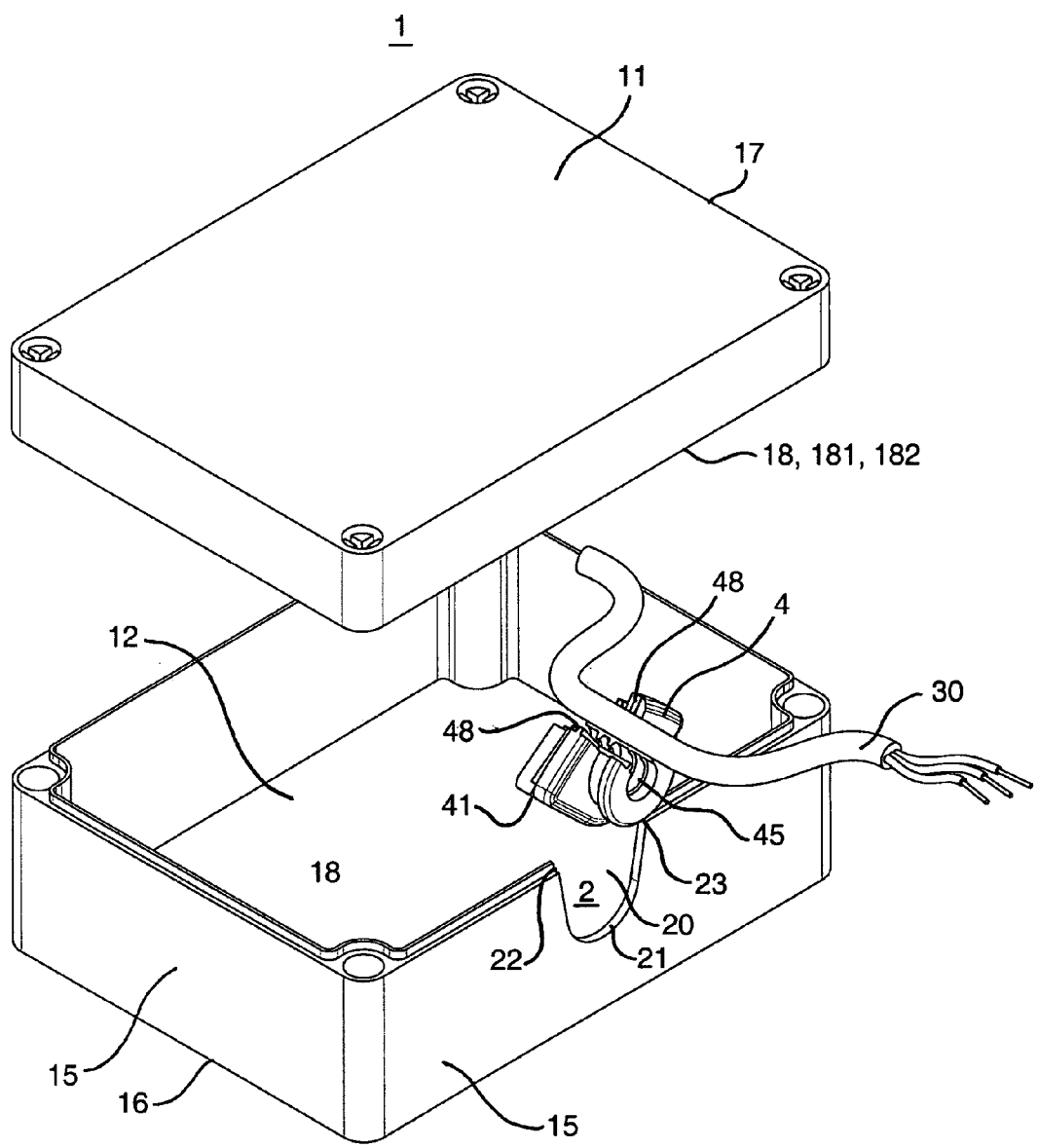
FIG. 1 shows an enclosure in an opened condition and in the middle of fitting a grommet around a rod-like element.

Fig. 1 shows an apparatus that includes an enclosure 1 and a grommet 4. The enclosure 1 which has a lead-through 2 for passing a rod-like element 30 through a wall 15 of the enclosure, said lead-through 2 being formed in a boundary surface 18 between a base section 16 and a lid section 17 of the enclosure, such that either the base section 16 or the lid section 17 is formed with a cutout 20, which opens from the boundary surface 18 into the enclosure wall 15 and which has a rim 21 starting from a first point 22 of the cutout rim 21 present at the boundary surface 18 and extending to a second point 23 of the cutout rim 21 present at the boundary surface 18. In the preferred embodiment depicted in the figure, the cutout 20 is thus formed in the enclosure's base section 16 and the lid section is planar across the entire boundary surface 18. Obviously in some embodiments the lid section can be provided with certain special formations in line with the lead-through, such as reliefs, reinforcements or the like, but these are not absolutely necessary for the invention in terms of its most preferred embodiment. The cutout 20 has its rim 21 preferably designed in a U- or V- shape and smooth in the sense of not having sharp discontinuities which are prone to develop a likely leakage point. Of course, fixing a grommet 4 in position can be effected by using a stud or the like formed in the recess. Making the rim 21 slightly conical in its U- or V-shape provides a favourable sealing performance as the grommet 4 presses tightly against the rim 21 of the cutout 20.

Figure 2:
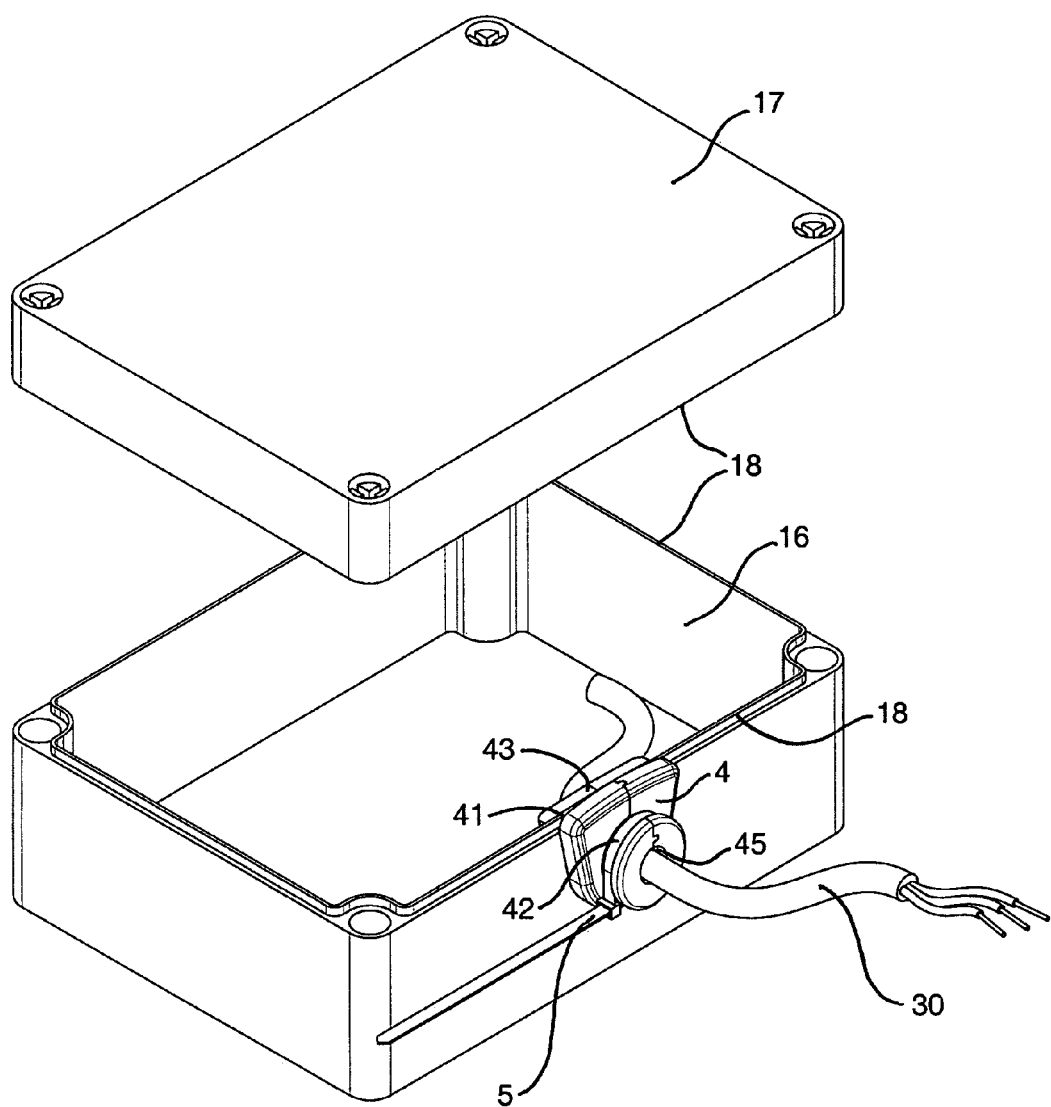
FIG. 2 shows an enclosure in an opened condition, but as grommet fitted loosely in place with a rod-like element fastened.
Figure 3:
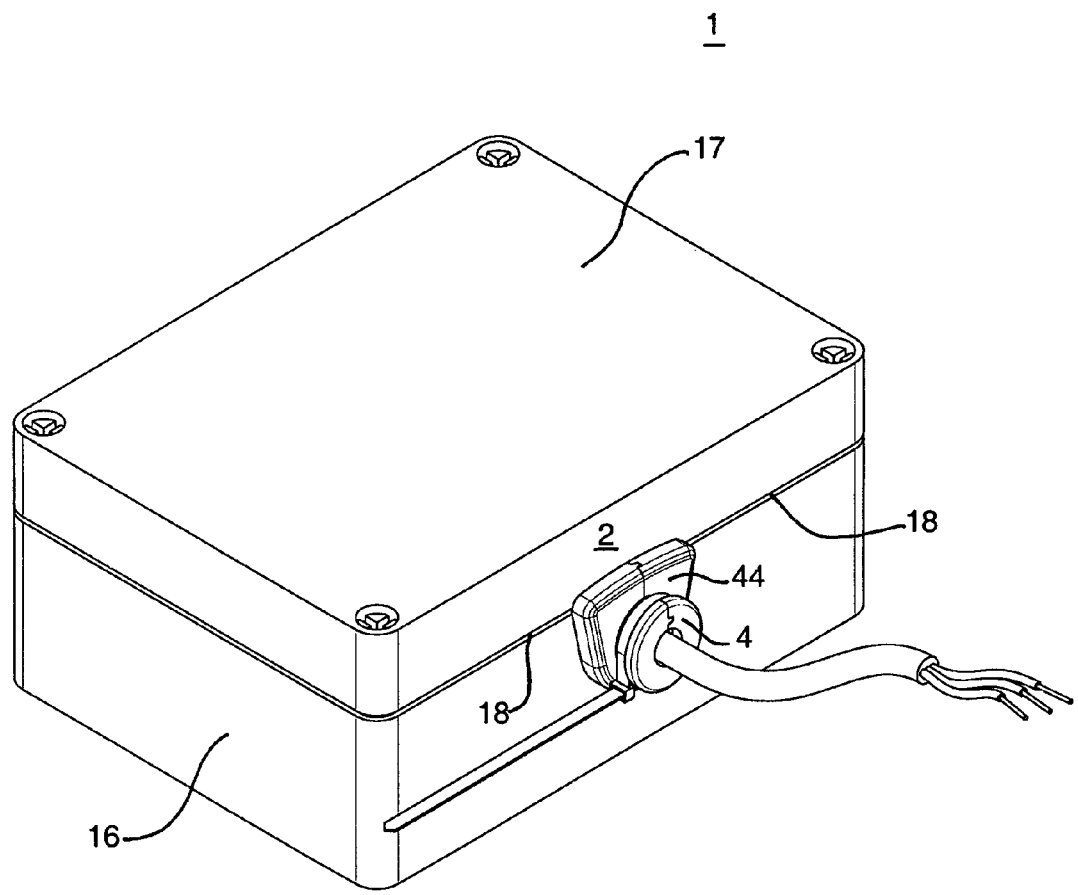
FIG. 3 shows an enclosure in a sealingly closed condition with a grommet and a rod-like element securely fastened and sealed.

FIG. 1 further shows a passage 45 present in the grommet 4 for a rod-like element 30 and the way of passing the rod-like element 30 through into the enclosure 1 without threading in axial direction as the enclosure has its base section 16 and lid section 17 apart from each other to enable fitting the grommet 4 around the rod-like element 30 along a route established by a split face 48 and further to enable fitting the grommet 4 in the cutout 20 by aligning a first recess 41 and the cutout's 20 rim 21 relative to each other, whereby an assembly consisting of the grommet 4 and the rod-like element 30 is insertable in position (as in FIG. 2) and further fastenable and tightly sealable by fixing the enclosure's lid section 17 and the enclosure's base section 16 to each other (as in FIG. 3). This enables the provision of a lead-through solution, which can be easily and reliably retrofitted to a previously manufactured rod-like element, which is provided with premounted connectors whose external dimensions are typically substantially larger than the outer diameter of a cable associated therewith. By virtue of a splitting structure of the lead-through, the customer is able to employ ready-to-use cables or to premount connectors to cables in locations other than the installation site. FIG. 1 shows also a front wall 11 and a rear wall 12 for the enclosure.

FIG. 2 shows a condition in which, when a grommet 4 has been set loosely in place in the cutout 20, a side 43 of the grommet corresponding to the boundary surface 18 lies at a distance e outside the boundary surface 18, the grommet 4 features a first recess 41 transverse to the axial direction of a passage 45 for the rod-like element 30, and a second recess 42, the first recess 41 being adapted to match the cutout rim 21 and the second recess 42 being adapted to receive a clamping element 5 which is adapted to secure and seal the rod-like element 30 to the grommet 4 by applying a radial compression to the rod-like element 30.

Figure 5:
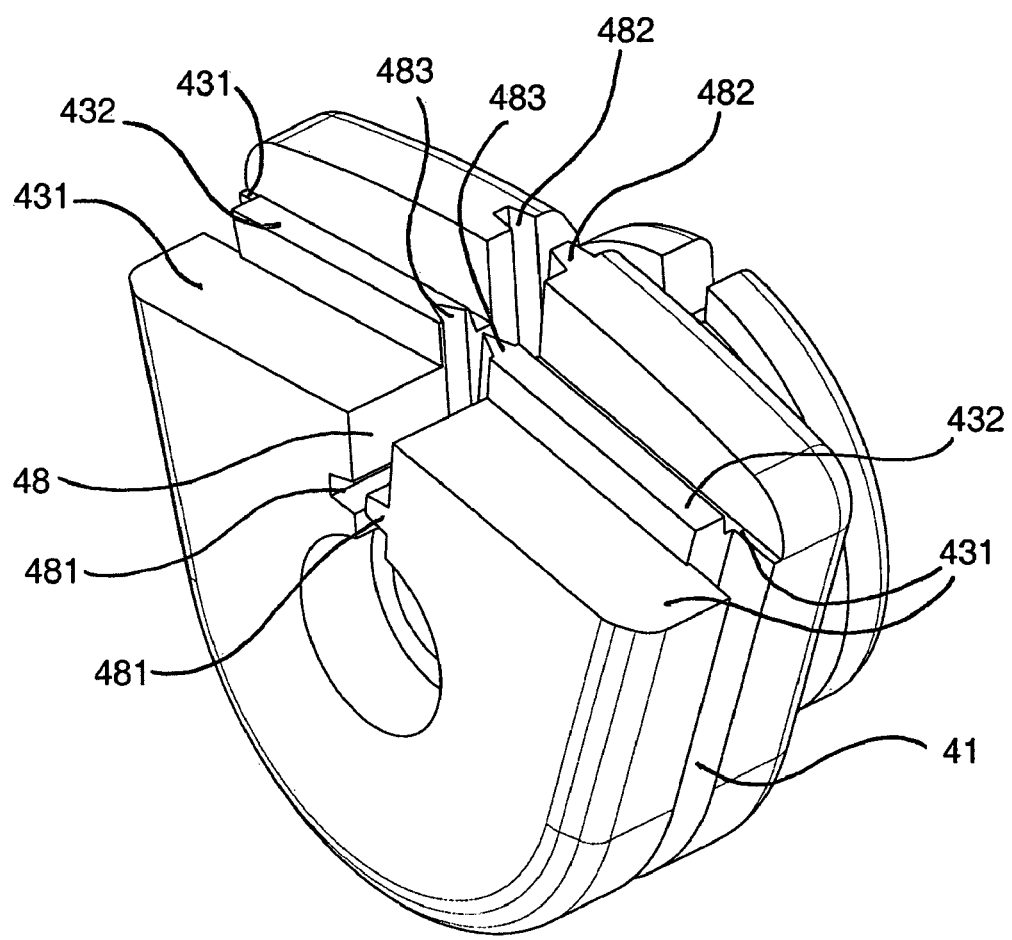
FIG. 5 shows a grommet in a rest position, the split face being open in a slightly V-shaped position, as seen from the side opposite to a second recess.

Preferably, one section of the enclosure has its boundary surface 18 formed with a sealing groove 181 and/or flush faces 182 (not shown in the figures), which is or are complementary to a ridge 431 or ridges 431 and a sealing ridge 432, depicted in more detail in FIG. 5 and provided on the side 43 of the grommet 4 corresponding to the boundary surface 18. Still more specifically, when the enclosure has its lid section 17 sealingly fastened to the enclosure's base section 16, the flush face 182 present in the boundary surface 18 of one section 16, 17 of the enclosure 1 applies pressure on the at least two ridges 431 of the grommet 4 on both sides of the actual sealing face 432, whereby the sealing ridge 432 constitutes the uppermost lead-through edge of the side 43 of the grommet 4 corresponding to the boundary surface 18, said edge being pressed into the sealing groove 181 provided in the other section 16, 17 of the enclosure. This way, the grommet 4 is pressed into its position by the lid section 17 applying pressure on both the front and the rear ridge 431. Hence, the sealing ridge 432 pressing into e.g. an urethane seal present in the enclosure's lid section 17 does not essentially participate in the process of pressing the grommet 4 in place. Both the sealing face 432 and the flush faces 431 are located higher in an opened condition of the enclosure than when the enclosure's lid section 17 is sealingly fastened to the enclosure's base section 16, yet the engagement force clamping and sealing the grommet 4 is principally applied to the flush faces 431 rather than to the sealing ridge 432.

FIG. 3 shows a condition in which, when the enclosure has its lid section 17 sealingly fastened to the enclosure's base section 16, a flange 44 of the grommet 4 covers a joint 18 or has the boundary surface 18 closed between the base section 16 and the lid section 17 across the lead-through 2 over a length which exceeds the distance between the first point 22 and the second point 23, said length being preferably symmetrical with respect to the first point 22 and the second point 23. In FIG. 3, the first point 22 and the second point 23 are hidden behind the flange 44, and hence not shown in FIG. 3 but instead in FIG. 1. This provides an improvement in the lead-through sealing, especially against splash water, since the most critical point regarding the tightness of a closed and sealed enclosure 1 is a junction of three structural elements at the first point 22 and at the second point 23.

According to one preferred embodiment, the first recess 41 in the grommet 4 fitted in connection with the enclosure 1 has a width which is equal to or smaller than the thickness of the enclosure's 1 wall 15. Thus, the grommet 4 sits snugly in the cutout 20 with no extra clearance in the fitting. The fact that the first recess has a width, which is slightly less than the thickness of the enclosure's 1 wall 15, provides for a slightly interfering fit between these two, thus resulting in a good sealing performance and a strong joint in terms of its strain relief properties. On the other hand, if the first recess 41 is too narrow, the fitting of a grommet in the cutout 2 obviously becomes more difficult.

A clamping element 5 shown installed in FIGS. 2 and 3 is one of the group comprising tying wires, pipe clamps and similar band-like tighteners, which can be disengageably mountable or disposable clamps to be unclamped by cutting or breaking. The second recess 42 of the grommet 4 has a width which is equal to or larger than the width of the clamping element 5. Since the widths of typing wires and the like are typically a few tenths of a millimeter short of full millimeters, the widths of the grommet's 4 second recess 42 for grommets 4 of various sizes can be picked up, for example, from among 3 mm, 4 mm, 5 mm, 8 mm, 10 mm, 15 mm. This of course applies to the case that grommets and/or enclosures are manufactured in a plurality of size classes. Thus, the mounting and/or dismounting of a clamping element is easy and quick and further the operation of a clamping element is impeccable.

Figure 4:
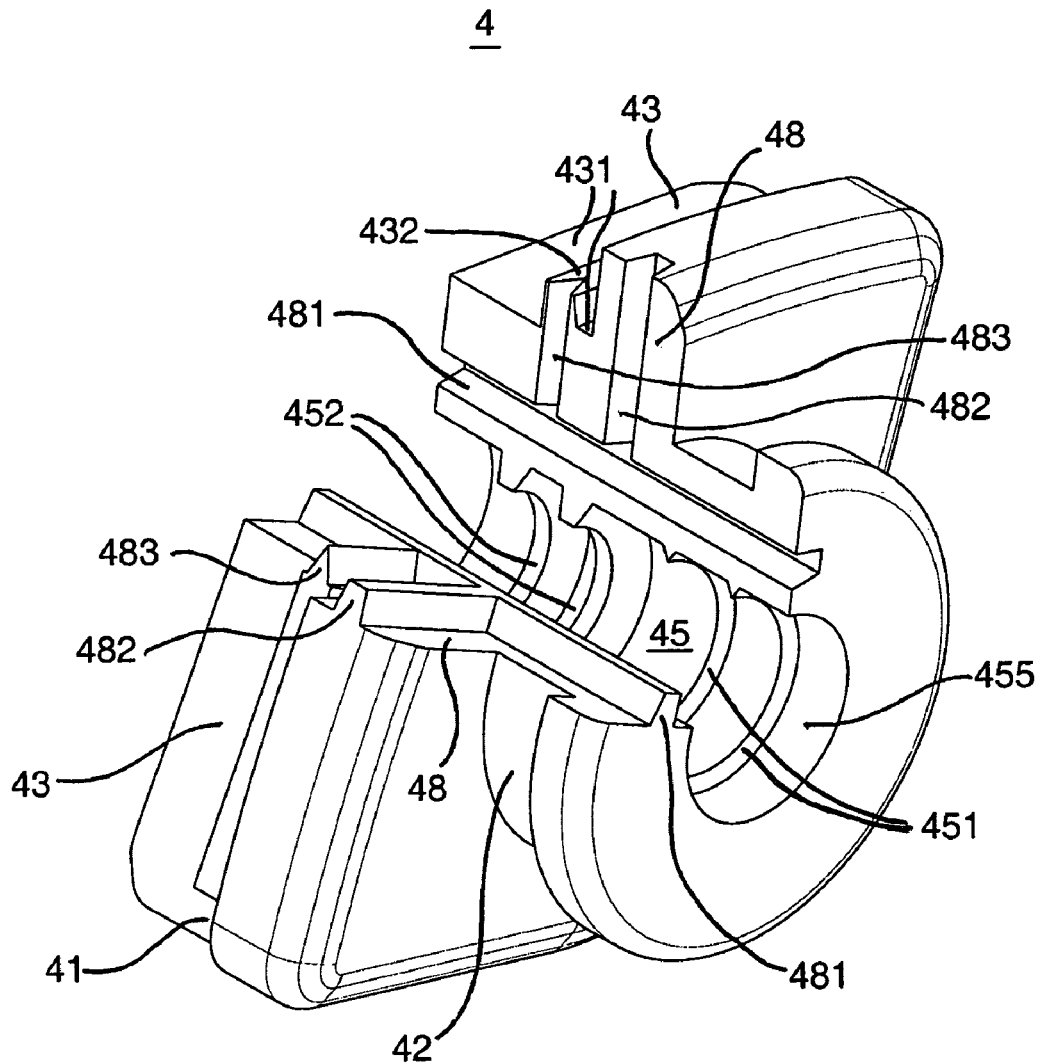
FIG. 4 shows a grommet with a split face stretched open as seen from the side of a second recess.
Figure 6:
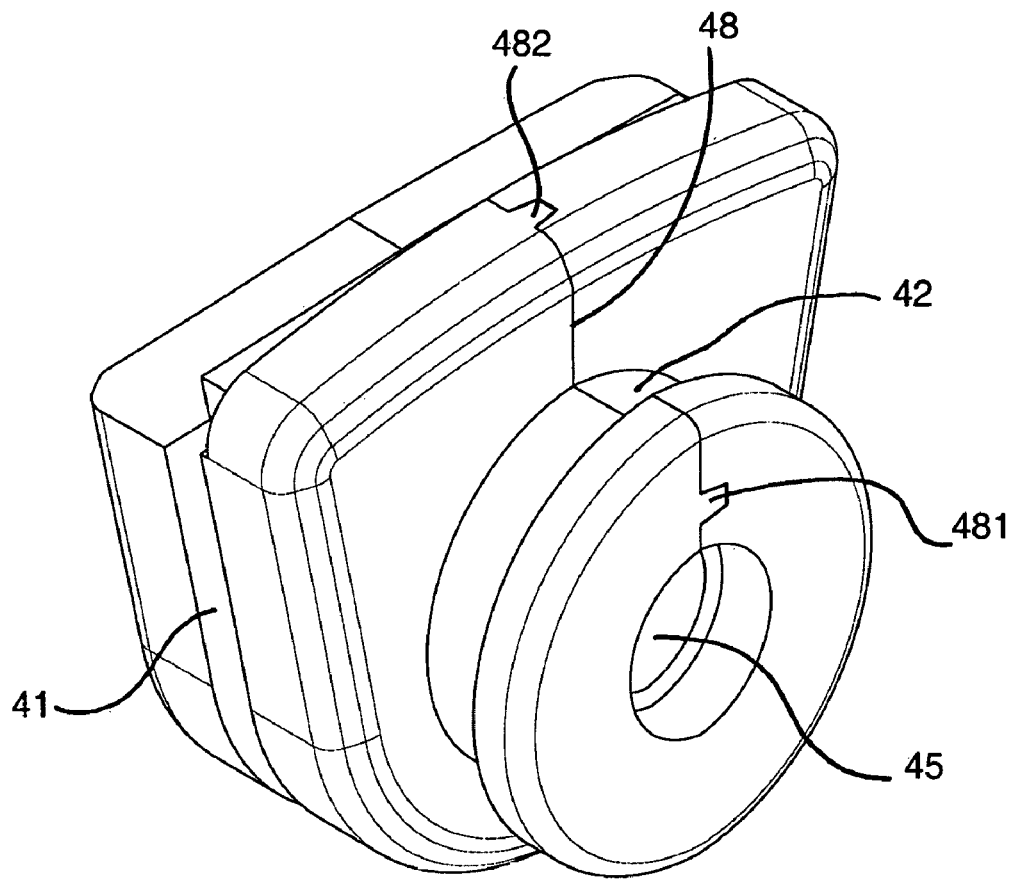
FIG. 6 shows a grommet with the split face closed, as seen from the side of a second recess.

FIGS. 4, 5 and 6 illustrate a grommet 4: with a passage 45 for passing a rod-like element 30 therealong through the grommet 4 and said grommet 4 having its walls 455 adapted to fit around the rod-like element 30. The grommet 4 includes a side 43 corresponding to a boundary surface 18 and a first recess 41 adapted to match at least a rim 21 of a cutout 20 in the enclosure. A second recess 42 is adapted to receive a clamping element 5 which is adapted to secure and seal the rod-like element 30 to the grommet 4 by applying a radial compression to the rod-like element 30. The grommet 4 includes one split face 48, which establishes an openable route between the exterior of the grommet 4 and the passage 45, said split face 48 being provided with sealing elements 481, 482, 483 for an axially directed and radially directed alignment and sealing of the split face 48. This way is provided a grommet 4, which fits snugly in the enclosure's 1 cutout 20 and seals securely possible leakage points between the enclosure 1 and the grommet 4 as well as between the grommet 4 and the rod-like element 30.

The passage 45 has its walls 455 formed with sealing elements 451, 452 for sealing a gap between the grommet 4 and the rod-like element 30. Preferably, there are several sealing elements 451, 452, some being in a conical shape and some in a truncated conical shape for a good final result in terms of both strain relief and sealing. A truncated cone reshapes less and provides a longer compression length, while a cone shape conforms slightly more tightly to a surface of the rod-like element 30.

It is shown especially in FIG. 5 that the side 43 of the grommet 4 corresponding to the boundary surface 18 is formed with a ridge 431 or ridges 431 and a sealing ridge 432, which is or are complementary to sealing grooves 181 or flush faces 182 present in the boundary surface 18 of one section of the enclosure. Hence, the compressive force applied to the grommet has a more or less symmetrical effect with respect to the first recess 41, the grommet being provided with an elastic deformation which is optimal in terms of strain relief and sealing properties.

It is further shown in FIG. 5 that the sealing elements 481, 482, 483 provided on the split face 48 have profiles in the shape of a cone or a truncated cone, the sealing element 481, 482, 483 present on a first side of the split face 48 forming a ridge and the sealing element 481, 482, 483 present on a second side forming a complementary groove. Preferably, one of the sealing elements 481, 482, 483 is positioned in line with the sealing ridge 432 as such a solution further provides a highly favourable sealing performance.

FIG. 6 shows a grommet 4 in which, when the split face 48 is compressed together or in its natural closed position, the axially directed sealing element 481 prevents a radially directed strain in the split face, while the radially directed sealing elements 482, 483 prevent an axially directed strain and leak in the split face 48.

Fig. 6 shows also how the second recess 42 is disposed at a distance from the first recess 41 for fitting and tightening the clamping element 5 without a substantial impact on a cross-section of the grommet 4 in coincidence with the wall 15. Thus, the grommet is not subjected to a substantial strain or a deformation from the originally designed shape, whereby the possibility of undesired leaks remain slight as well. Thus, the second recess 42 is preferably disposed in a protruding cylindrical element, wherein a radial compression of the clamping element 5 is able to function freely around the rod-like element 30. Obviously, the passage is adapted in terms of its cross-sectional shape and area to match the cross-sectional shape and area of the rod-like element 30 for fitting the rod-like element 30 in the grommet 4 without play. By selecting a grommet 4 of a wrong size in relation to a rod-like element 30, the functionality therebetween can be naturally precluded. That is, the grommet of a given size accepts a given range of cross-sections for the rod-like article. The ridges or sealing elements 451, 452 are designed for such a function that, for example in one grommet, the permitted cross-sectional variation corresponds to the range of 6.5-9.5 mm in diameter. The passage 45 has an inner diameter of 9.5 mm and the inner diameter defined by the sealing ridges 452 is 6.5 mm as the grommet has its split face pressed together but is otherwise in a rest condition, i.e. not fitted in the enclosure's cutout 20. The grommet 4 is slightly oversized for the enclosure's cutout 20, whereby the above-mentioned inner diameter dimensions will be compressed slightly smaller with the grommet pressed in place and the enclosure's lid fastened.

From the functional standpoint of a grommet it is beneficial that the fist recess 41 has a depth which is equal to or larger than its width. It is likewise beneficial that flanges 44 remaining on the outsides of the first recess 41 are adapted to have a thickness which is at least equal to the width of the first recess 41. The depth of a first recess has an effect not only on the sealing length but also on strain relief properties. The depth of a first recess 41 and the thickness of a flange 44 establish jointly a structural strength for the grommet in the event that the structure is subjected to a mechanical force through the intermediary of a rod-like element. If, for example, the rod-like element transmits tension to a grommet, at some point, as the force increases too much, the flange 44 will probably give in and the rim 21 of an enclosure 1 slips off the first recess. This structural or constructive strength of a grommet can be further enhanced in such a way that the grommet material inside the flange or flanges (44) can be inflexible in comparison with an elastic material in the rest of the structure. In practice, inside the flanges can be cast reinforcements or auxiliary flanges in high-strength plastics. Annular pieces of steel are also useful, especially if made in two-part components with respect to a split face 48, such that the split face 48 is still easy to open with the opposite side of the split face 48 functioning in the way of a hinge.

Reference numbers used in the figures:
1 enclosure
11 front wall of the enclosure
12 rear wall of the enclosure
15 wall of the enclosure
16 base section of the enclosure
17 lid section of the enclosure
18 boundary surface between a base section and a lid section of the enclosure
181 sealing groove
182 flush face
2 lead-through
20 cutout
21 cutout rim
22 first point of the cutout rim
23 second point of the cutout rim
30 rod-like element
4 grommet
41 recess, corresponding to the rim
42 recess, corresponding to the locking element
43 side, corresponding to the boundary surface
431 ridge
432 sealing ridge
44 flange
45 passage 451 sealing element
452 sealing element
455 walls of the passage
48 split face
481 sealing element of the split face
482 sealing element of the split face
483 sealing element of the split face
5 locking element

The invention claimed is:

1. An apparatus comprising an enclosure which has a lead-through for passing a rod-like element through a wall of the enclosure, said lead-through being formed in a boundary surface between a base section and a lid section of the enclosure, such that either the base section or the lid section is formed with a cutout, which opens from the boundary surface into the enclosure wall and which has a rim starting from a first point of the cutout rim present at the boundary surface and extending to a second point of the cutout rim present at the boundary surface; and, a grommet comprising a passage for passing the rod-like element, the grommet configured to set loosely in place in the cutout, a side of the grommet corresponding to the boundary surface lies at a distance outside the boundary surface, the grommet having one split face, which establishes an openable route between the exterior of the grommet and the passage, the grommet having a first recess transverse to an axial direction of the passage for the rod-like element, and a second recess, the first recess being configured to match the cutout rim and the second recess being configured to receive a clamping element which is configured to secure and seal the rod-like element to the grommet by applying a radial compression to the rod-like element;

wherein the enclosure is configured so that when the enclosure has its lid section sealingly attached to the enclosure's base section, an engagement force therebetween causes the side of the grommet corresponding to the boundary surface to press itself flush with the boundary surface, the grommet clamping and sealing against the rod-like element, against the rims of the cutout to the wall and against the side of the grommet corresponding to the boundary surface, and further wherein sealing elements in a split face of the grommet clamp and seal against each other.

2. The apparatus as set forth in claim 1, wherein the rod-like element is configured so as to be capable of being passed through inside the enclosure without threading in an axial direction as the enclosure has its base section and lid section apart from each other for fitting the grommet around the rod-like element along a route established by the split face and further for fitting the grommet in the cutout by aligning the first recess and the cutout's rim relative to each other, whereby an assembly consisting of the grommet and the rod-like element is insertable in position and further fastenable and tightly sealable by fixing the enclosure's lid section and the enclosure's base section to each other.

3. The apparatus as set forth in claim 1, wherein, when the enclosure has its lid section sealingly fastened to the enclosure's base section, a flange of the grommet covers a joint between the base section and the lid section across the lead-through over a length which exceeds the distance between the first point and the second point, said length being preferably symmetrical with respect to the first point and the second point.

4. The apparatus as set forth in claim 1, wherein one section of the enclosure has its boundary surface formed with a sealing groove and/or flush faces, which is or are complementary to a ridge or ridges and a sealing ridge provided on the side of the grommet corresponding to the boundary surface.

5. The apparatus as set forth in claim 4, wherein when the enclosure has its lid section sealingly fastened to the enclosure's base section, the flush faces present in the boundary surface of one section of the enclosure applies pressure on the ridge or ridges of the grommet on both sides of the actual sealing face, whereby the sealing ridge constitutes the uppermost lead-through edge of the side of the grommet corresponding to the boundary surface, said edge being pressed into the sealing groove provided in the other section of the enclosure.

6. The apparatus as set forth in claim 4, wherein both the sealing face and the flush faces are located higher in an opened condition of the enclosure than when the enclosure's lid section is sealingly fastened to the enclosure's base section, yet the engagement force clamping and sealing the grommet is principally applied to the flush faces rather than to the sealing ridge.

7. The apparatus as set forth in claim 1, wherein the grommet in at least part of the structure is made of a material which is elastic but preferably almost incompressible, such as rubber or the like elastomer.

8. The apparatus as set forth in claim 1, wherein in terms of its width the first recess of the grommet is equal to or smaller than the thickness of the enclosure's wall.

9. The apparatus as set forth in claim 1, wherein the clamping element is one of the group comprising tying wires, pipe clamps and similar band-like tighteners, which can be disengageably mountable or disposable clamps to be unclamped by cutting or breaking.

10. A grommet for sealing a rod-like element to a wall of an enclosure, said grommet comprising a passage for passing the rod-like element therealong through the grommet and said passage having its walls configured to fit around the rod-like element, a side corresponding to a boundary surface;

a first recess configured to match at least a rim of a cutout in the enclosure;

a second recess, configured to receive a clamping element which is configured to secure and seal the rod-like element to the grommet by applying a radial compression to the rod-like element; and one split face, which establishes an openable route between the exterior of the grommet and the passage, said split face being provided with sealing elements for an axially directed and radially directed alignment and sealing of the split face; wherein the passage has its walls formed with sealing elements which line the circumference of the passage and are of conical shape for sealing a gap between the grommet and the rod-like element.

11. The grommet as set forth in claim 10, wherein the side of the grommet corresponding to the boundary surface is formed with a ridge or ridges and a sealing ridge, which is or are complementary to sealing grooves or flush faces present in the boundary surface of one section of the enclosure.

12. The grommet as set forth in claim 10, wherein in terms of profiles the sealing elements provided on the split face are in the shape of a cone or a truncated cone, the sealing element present on a first side of the split face forming a ridge and the sealing element present on a second side forming a complementary groove.

13. The grommet as set forth in claim 10, wherein when the split face has been compressed together, the axially directed sealing element prevents a radially directed strain in the split face, while the radially directed sealing elements prevent an axially directed strain and leak in the split face.

14. The grommet as set forth in claim 10, wherein the second recess is disposed at a distance from the first recess for fitting and tightening the clamping element without a substantial impact on a cross-section of the grommet in coincidence with the wall.

15. The grommet as set forth in claim 10, wherein the passage is configured in terms of its cross-sectional shape and area to match the cross- sectional shape and area of the rod-like element for fitting the rod-like element in the grommet without play.

16. The grommet as set forth in claim 10, wherein in terms of its width the second recess is equal to or larger than the width of the clamping element.

17. The grommet as set forth in claim 10, wherein the first recess has a depth which is equal to or larger than its width.

18. The grommet as set forth in claim 10, wherein flanges remaining on the outsides of the first recess are configured to have a thickness which is at least equal to the width of the first recess.

19. The grommet as set forth in claim 10, wherein the grommet in at least part of the structure is made of a material which is elastic but preferably almost incompressible, such as rubber or the like elastomer.

20. The grommet as set forth in claim 10, wherein the grommet material inside the flange or flanges can be inflexible in comparison with an elastic material in the rest of the structure.

* * * * *